No. 739,320. PATENTED SEPT. 22, 1903.
J. N. KAILOR.
SPRING KING POST.
APPLICATION FILED JUNE 15, 1903.
NO MODEL.
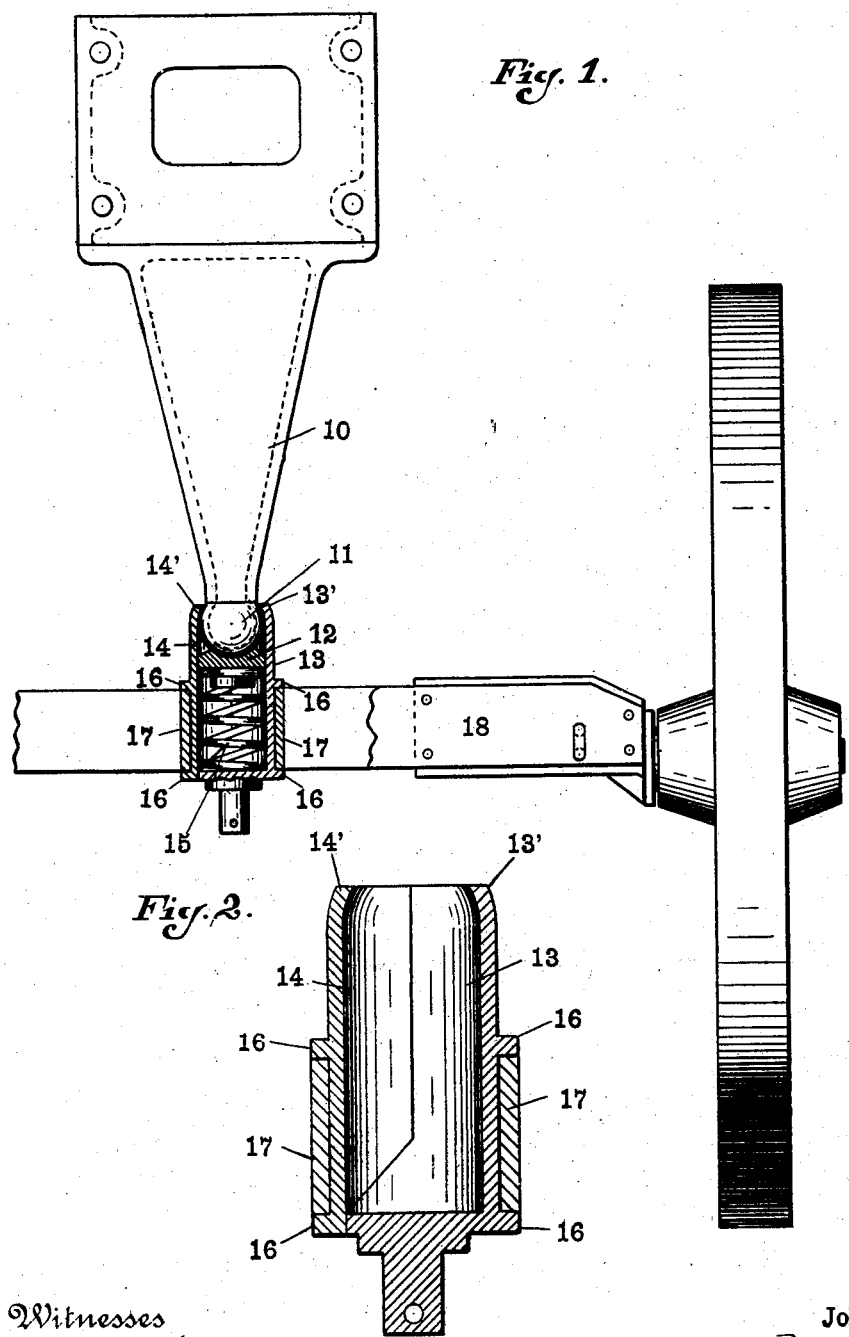
Inventor
John N. Kailor
Witnesses
Adelaide Kearns.
J. A. Walsh.
By
Bradford & Hood
Attorneys No. 739,320. Patented September 22, 1903.

UNITED STATES PATENT OFFICE.

JOHN N. KAILOR, OF COLUMBUS, INDIANA, ASSIGNOR TO REEVES & COMPANY, OF COLUMBUS, INDIANA, A CORPORATION OF INDIANA.

SPRING KING-POST.

SPECIFICATION forming part of Letters Patent No. 739,320, dated September 22, 1903.

Application filed June 15, 1903. Serial No. 161,562. (No model.)

*To all whom it may concern:*

Be it known that I, JOHN N. KAILOR, a citizen of the United States, residing at Columbus, in the county of Bartholomew and State of Indiana, have invented certain new and useful Improvements in Spring King-Posts, of which the following is a specification.

The object of my invention is to produce a cheap but efficient spring king-post by means of which a connection may be made between a front axle and a vehicle of such character that the front axle may be capable of oscillation both in vertical and horizontal planes and also capable of permitting a vertical vibration of the vehicle with relation to the axle.

The accompanying drawings illustrate my invention.

Figure 1 is a central vertical sectional view of my device, the post proper being shown in full lines; and Fig. 2 is an enlarged sectional detail of the casing.

In the drawings, 10 indicates a post adapted to be secured to the under side of the forward end of the vehicle and provided at its lower end with a ball 11. The ball-shaped end of the post 10 is adapted to rest in a socket or cup-plate 12, which is vertically reciprocable in a casing composed of two sections 13 and 14, which sections together form a cylinder within which is mounted a spring 15, which supports cup 12. The sections 13 and 14 are separable, as shown, and are formed at their upper ends each with an overhanging or inturned lip 13' and 14', respectively, which serve to prevent the ball of post 10 from being entirely withdrawn from the casing. The two sections 13 and 14 are provided with flanges 16, between which may pass suitable bars 17 of axle 18.

In operation the spring 15 is of sufficient strength to normally maintain the ball 11 in the upper end of the casing; but the post 10 is capable of a downward depression, as will be readily understood. In any position, however, the axle 18 is free to be swung about the ball either in a horizontal plane or in vertical planes or in intermediate planes, so that there is entire freedom of movement.

I claim as my invention—

A spring king-post construction consisting of a casing composed of a pair of mating sections, a spring therein, a cup-plate engaged by the spring, and a post having an end engaging the cup-plate and capable of universal movement therein.

In witness whereof I have hereunto set my hand and seal, at Columbus, Indiana, this 10th day of June, A. D. 1903.

JOHN N. KAILOR. [L. S.]

Witnesses:
HELEN J. HALBERT,
BERTHA L. HARRISON.